United States Patent
Shao et al.

(10) Patent No.: US 11,101,892 B2
(45) Date of Patent: Aug. 24, 2021

(54) SIGNAL SENDING METHOD AND APPARATUS

(71) Applicant: Huawei Technologies Co., Ltd., Shenzhen (CN)

(72) Inventors: Guanghao Shao, Shenzhen (CN); Peng Dong, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/844,864

(22) Filed: Apr. 9, 2020

(65) Prior Publication Data
US 2020/0235818 A1 Jul. 23, 2020

Related U.S. Application Data

(63) Continuation of application No. PCT/CN2019/082934, filed on Apr. 16, 2019.

(30) Foreign Application Priority Data

Apr. 17, 2018 (CN) .......................... 201810341115.5

(51) Int. Cl.
*H04B 10/27* (2013.01)
*H04B 10/572* (2013.01)
*H04B 10/50* (2013.01)

(52) U.S. Cl.
CPC ........... *H04B 10/572* (2013.01); *H04B 10/27* (2013.01); *H04B 10/505* (2013.01)

(58) Field of Classification Search
CPC .... H04B 10/572; H04B 10/505; H04B 10/27; H04B 10/0795
See application file for complete search history.

(56) References Cited

U.S. PATENT DOCUMENTS

| | | | |
|---|---|---|---|
| 6,388,782 B1 | 5/2002 | Stephens et al. | |
| 9,762,349 B1 | 9/2017 | Dai | |
| (Continued) | | | |

FOREIGN PATENT DOCUMENTS

| | | |
|---|---|---|
| CN | 1103150 C | 3/2003 |
| CN | 102804701 A | 11/2012 |
| (Continued) | | |

OTHER PUBLICATIONS

EP/19789168, Search Report, dated Dec. 7, 2020.

*Primary Examiner* — Dzung D Tran
(74) *Attorney, Agent, or Firm* — Leydig, Voit & Mayer, Ltd.

(57) ABSTRACT

Signal sending method and apparatus. The signal sending method includes: sending, by a first apparatus, an optical signal to a second apparatus in a slot before a first wavelength slot; sending, by the first apparatus, a first optical signal to the second apparatus in the first wavelength slot; and sending, by the first apparatus, an optical signal to a second apparatus in the slot after the first wavelength slot. A wavelength of the first optical signal is a first wavelength. The first optical signal sent by the first apparatus in one first wavelength slot is used to carry first wavelength data on one symbol. Wavelengths of the optical signals sent by the first apparatus in the slots before and after the first wavelength slot are wavelengths other than the first wavelength.

19 Claims, 4 Drawing Sheets

(56) References Cited

U.S. PATENT DOCUMENTS

| | | | | |
|---|---|---|---|---|
| 2012/0093509 A1* | 4/2012 | Kazawa | .............. | H04J 14/0247 |
| | | | | 398/58 |
| 2012/0106958 A1* | 5/2012 | Sakamoto | ........... | H04J 14/0252 |
| | | | | 398/58 |
| 2013/0004174 A1* | 1/2013 | Lee | ..................... | H04J 14/0257 |
| | | | | 398/79 |
| 2013/0230315 A1* | 9/2013 | Sarashina | .......... | H04B 10/0795 |
| | | | | 398/25 |
| 2017/0324472 A1* | 11/2017 | Kitamura | .................. | H04J 3/16 |

FOREIGN PATENT DOCUMENTS

| | | |
|---|---|---|
| CN | 106059704 A | 10/2016 |
| CN | 107005326 A | 8/2017 |
| EP | 0771091 A2 | 5/1997 |

\* cited by examiner

SIGNAL SENDING METHOD AND APPARATUS

CROSS-REFERENCE TO RELATED APPLICATIONS

This application is a continuation of International Application No. PCT/CN2019/082934, filed on Apr. 16, 2019, which claims priority to Chinese Patent Application No. 201810341115.5, filed on Apr. 17, 2018. The disclosures of the aforementioned applications are hereby incorporated by reference in their entireties.

TECHNICAL FIELD

This application relates to the field of communications technologies, and in particular, to a signal sending method and apparatus.

BACKGROUND

A passive optical network (PON) has developed rapidly in recent years and is characterized by simple maintenance and relatively low costs. The passive optical network usually includes an optical line terminal (OLT), an optical distribution network ( ), and an optical network unit (ONU).

As an optical communications technology develops and a service requirement improves, a downlink sending rate of an OLT is increasingly high. Currently, a downlink sending rate defined in the standard has reached 40G, and a receiving rate of an ONU increases accordingly. Consequently, costs of the ONU greatly increase.

SUMMARY

Embodiments of the present invention provide a signal sending method and apparatus, to avoid a very high receiving rate of a receive side.

According to a first aspect, a signal sending method is provided and includes: sending, by a first apparatus, an optical signal to a second apparatus in a slot before a first wavelength slot; sending, by the first apparatus, a first optical signal to the second apparatus in the first wavelength slot; and sending, by the first apparatus, an optical signal to the second apparatus in a slot after the first wavelength slot, where a wavelength of the first optical signal is a first wavelength, the first optical signal sent by the first apparatus in one first wavelength slot is used to carry first wavelength data on one symbol, and wavelengths of the optical signals sent by the first apparatus in the slots before and after the first wavelength slot are wavelengths other than the first wavelength.

In this embodiment of the present invention, the first apparatus sends the optical signal in both the slots before and after the first wavelength slot. However, neither of the wavelengths of the sent optical signals includes the first wavelength. To be specific, a rate of sending the optical signal by the first apparatus is greater than a rate of sending the optical signal with the first wavelength by the first apparatus. In addition, the first optical signal sent in one first wavelength slot is used to carry the first wavelength data on one symbol. Therefore, a receiving and demodulation rate of the optical signal with the first wavelength is reduced.

In a possible design, the first apparatus periodically sends an optical signal, one sending period includes N slots, N is an integer greater than 1, and the N slots include at least one first wavelength slot.

In a possible design, the slot after the first wavelength slot is a second wavelength slot, and the sending, by the first apparatus, an optical signal to the second apparatus in a slot after the first wavelength slot includes: sending, by the first apparatus, a second optical signal to the second apparatus in the second wavelength slot; and the method further includes: sending, by the first apparatus, an optical signal to the second apparatus in a slot after the second wavelength slot, where a wavelength of the second optical signal is a second wavelength, the second optical signal sent by the first apparatus in one second wavelength slot is used to carry second wavelength data on one symbol, and a wavelength of the optical signal sent by the first apparatus in the slot after the second wavelength slot is a wavelength other than the second wavelength.

In a possible design, the N slots further include at least one $I^{th}$ wavelength slot, where I is an integer greater than 1 and less than or equal to N, and the method further includes: sending, by the first apparatus, an optical signal to the second apparatus in a slot before the $I^{th}$ wavelength slot; sending, by the first apparatus, an $I^{th}$ optical signal to the second apparatus in the $I^{th}$ wavelength slot; and sending, by the first apparatus, an optical signal to the second apparatus in a slot after the $I^{th}$ wavelength slot, where a wavelength of the $I^{th}$ optical signal is an $I^{th}$ wavelength, the $I^{th}$ optical signal sent by the first apparatus in one $I^{th}$ wavelength slot is used to carry $I^{th}$ wavelength data on one symbol, and wavelengths of the optical signals sent by the first apparatus in the slots before and after the $I^{th}$ wavelength slot are wavelengths other than the $I^{th}$ wavelength.

In this embodiment of the present invention, another wavelength slot is further included to send other wavelength data.

In a possible design, the N slots further include at least one second wavelength slot, and the method further includes: sending, by the first apparatus, the first optical signal to the second apparatus in the slot before the second wavelength slot; sending, by the first apparatus, a second optical signal to the second apparatus in the second wavelength slot; and sending, by the first apparatus, an optical signal to the second apparatus in a slot after the second wavelength slot, where a wavelength of the second optical signal is a second wavelength, the second optical signal sent by the first apparatus in one second wavelength slot is used to carry second wavelength data on one symbol, wavelengths of the optical signals sent by the first apparatus in the slots before and after the second wavelength slot are wavelengths other than the second wavelength, and the slot after the first wavelength slot is the second wavelength slot.

In a possible design, the N slots include one first wavelength slot; or the N slots include two first wavelength slots, and there are (N/2−1) slots between the two first wavelength slots, where N may be exactly divided by 2; or the N slots include J first wavelength slots, and there are (N/J−1) slots between two adjacent first wavelength slots, where N may be exactly divided by J.

In a possible design, there is one first wavelength slot and one $I^{th}$ wavelength slot that are in the N slots, where I is an integer from 2 to N.

In this embodiment of the present invention, all the N slots are wavelength slots. A slot resource is fully utilized. There is one wavelength slot of each type, and receiving rates of all wavelength slots are consistent. A product is easy to implement.

In a possible design, a sending rate of the first apparatus is W, and duration of the first wavelength slot, duration of the slot before the first wavelength slot, and duration of the slot after the first wavelength slot are all 1/W.

In a possible design, the first device is an OLT, and the sending, by a first apparatus, an optical signal in a slot before a first wavelength slot includes: sending, by the first apparatus, the optical signal to an ODN in the slot before the first wavelength slot. The sending, by the first apparatus, a first optical signal in the first wavelength slot includes: sending, by the first apparatus, the first optical signal to the ODN in the first wavelength slot. The sending, by the first apparatus, an optical signal in a slot after the first wavelength slot includes: sending, by the first apparatus, the optical signal to the ODN in the slot after the first wavelength slot.

According to a second aspect, a signal sending apparatus is provided and includes a transmitter, configured to send an optical signal to a second apparatus in a slot before a first wavelength slot. The transmitter is further configured to send a first optical signal to the second apparatus in the first wavelength slot. The transmitter is further configured to send an optical signal to the second apparatus in a slot after the first wavelength slot. A wavelength of the first optical signal is a first wavelength. The first optical signal sent by the first apparatus in one first wavelength slot is used to carry first wavelength data on one symbol. Wavelengths of the optical signals sent by the first apparatus in the slots before and after the first wavelength slot are wavelengths other than the first wavelength.

In a possible design, the transmitter periodically sends an optical signal, one sending period includes N slots, N is an integer greater than 1, and the N slots include at least one first wavelength slot.

In a possible design, the slot after the first wavelength slot is a second wavelength slot, and that the transmitter is further configured to send an optical signal to the second apparatus in a slot after the first wavelength slot includes that the transmitter is further configured to send a second optical signal to the second apparatus in the second wavelength slot; and the transmitter is further configured to send an optical signal to the second apparatus in a slot after the second wavelength slot, where a wavelength of the second optical signal is a second wavelength, the second optical signal sent by the first apparatus in one second wavelength slot is used to carry second wavelength data on one symbol, and a wavelength of the optical signal sent by the first apparatus in the slot after the second wavelength slot is a wavelength other than the second wavelength.

In a possible design, the N slots further include at least one $I^{th}$ wavelength slot, where I is an integer greater than 1 and less than or equal to N. The transmitter is further configured to send an optical signal to the second apparatus in a slot before the $I^{th}$ wavelength slot. The transmitter is further configured to send an $I^{th}$ optical signal to the second apparatus in the $I^{th}$ wavelength slot. The transmitter is further configured to send an optical signal to the second apparatus in a slot after the $I^{th}$ wavelength slot. A wavelength of the $I^{th}$ optical signal is an $I^{th}$ wavelength. The $I^{th}$ optical signal sent by the first apparatus in one $I^{th}$ wavelength slot is used to carry $I^{th}$ wavelength data on one symbol. Wavelengths of the optical signals sent by the first apparatus in the slots before and after the $I^{th}$ wavelength slot are wavelengths other than the $I^{th}$ wavelength.

In a possible design, the N slots further include at least one second wavelength slot. The transmitter is further configured to send the first optical signal to the second apparatus in the slot before the second wavelength slot. The transmitter is further configured to send a second optical signal to the second apparatus in the second wavelength slot. The transmitter is further configured to send an optical signal to the second apparatus in a slot after the second wavelength slot. A wavelength of the second optical signal is a second wavelength. The second optical signal sent by the first apparatus in the second wavelength slot is used to carry second wavelength data on one symbol. Wavelengths of the optical signals sent by the first apparatus in the slots before and after the second wavelength slot are wavelengths other than the second wavelength. The slot after the first wavelength slot is the second wavelength slot.

In a possible design, the N slots include one first wavelength slot; or the N slots include two first wavelength slots, and there are (N/2−1) slots between the two first wavelength slots, where N may be exactly divided by 2; or the N slots include J first wavelength slots, and there are (N/J−1) slots between two adjacent first wavelength slots, where N may be exactly divided by J.

In a possible design, there is one first wavelength slot and one $I^{th}$ wavelength slot that are in the N slots, where I is an integer from 2 to N.

In a possible design, a sending rate of the transmitter is W, and duration of the first wavelength slot, duration of the slot before the first wavelength slot, and duration of the slot after the first wavelength slot are all 1/W.

In a possible design, the transmitter includes a laser and a modulator. The laser is configured to generate laser light of the first wavelength in the first wavelength slot. The modulator is configured to modulate the laser light of the first wavelength in the first wavelength slot by using the first wavelength data on one symbol, to obtain the first optical signal.

In a possible design, the transmitter includes a laser and a modulator. The laser is configured to generate laser light of the first wavelength in the first wavelength slot. The laser is further configured to generate laser light of the second wavelength in the slot after the first wavelength slot. The modulator is configured to modulate the laser light of the first wavelength in the first wavelength slot by using the first wavelength data on one symbol, to obtain the first optical signal. The modulator is further configured to modulate the laser light of the second wavelength in the slot after the first wavelength slot by using the second wavelength data on one symbol, to obtain the second optical signal.

According to a third aspect, a signal sending apparatus is provided, and the signal sending apparatus includes a processor and a memory, where the memory is configured to store a program, and the processor invokes the program stored in the memory, to perform the method provided in the first aspect of the present invention.

According to a fourth aspect, a signal sending apparatus is provided, and the signal sending apparatus includes at least one processing element (or a chip) configured to perform the method in the first aspect.

According to a fifth aspect, a computer storage medium including a program is provided, where the program is used to perform the method in the first aspect.

DESCRIPTION OF EMBODIMENTS

To make the objectives, technical solutions, and advantages of the present invention clearer and more comprehensible, the following further describes the present invention in detail with reference to the accompanying drawings and embodiments.

Before the technical solutions in the embodiments of this application are described, several technical terms in the embodiments of this application are first described.

Bit: is short for a binary digit, and is a smallest unit of data in a computer. One bit includes one binary value: 0 or 1.

Symbol: is an identification unit used during modulation and demodulation. For different modulation schemes, each symbol may include different quantities of bits. For example, for a non-return-to-zero (NRZ) modulation scheme, one symbol corresponds to one bit. For a modulation scheme of pulse amplitude modulation (PAM) 4, one symbol corresponds to two bits.

Slot: is a time interval.

Wavelength slot: is a slot used to transmit an optical signal with a wavelength. For example, a first wavelength slot is a slot used to transmit an optical signal with a first wavelength.

Wavelength data: is data transmitted by using an optical signal with a wavelength. For example, first wavelength data is data transmitted by using an optical signal with a first wavelength.

Figure 1A:
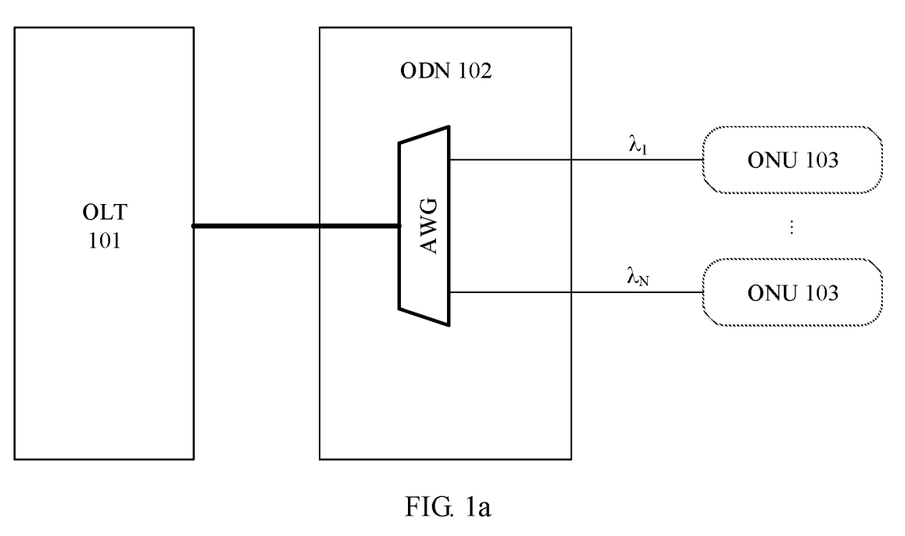
FIG. 1a is an architectural diagram of a system according to an embodiment of the present invention.

FIG. 1a is an architectural diagram of a system according to an embodiment of the present invention. The system includes an OLT 101, an ODN 102, and an ONU 103. The OLT 101 sends optical signals with a plurality of wavelengths to the ODN 102. The ODN 102 performs optical splitting processing, for example, may perform optical splitting processing by using an arrayed waveguide grating (AWG), and sends optical signals with different wavelengths to different ONUs 103 after optical splitting.

Figure 1B:
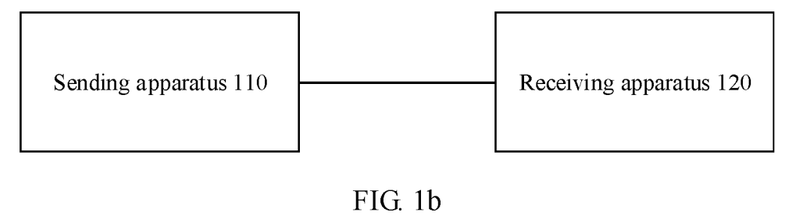
FIG. 1b is an architectural diagram of another system according to an embodiment of the present invention.

FIG. 1b is an architectural diagram of another system according to an embodiment of the present invention. The system includes a sending apparatus 110 and a receiving apparatus 120. The sending apparatus 110 sends optical signals with a plurality of wavelengths to the receiving apparatus 120, and the receiving apparatus 120 receives and demodulates an optical signal with at least one of the plurality of wavelengths. FIG. 1a and FIG. 1b are merely examples of architectural diagrams of systems. The embodiments of the present invention may operate in various optical communications systems. This is not limited herein.

Figure 2:
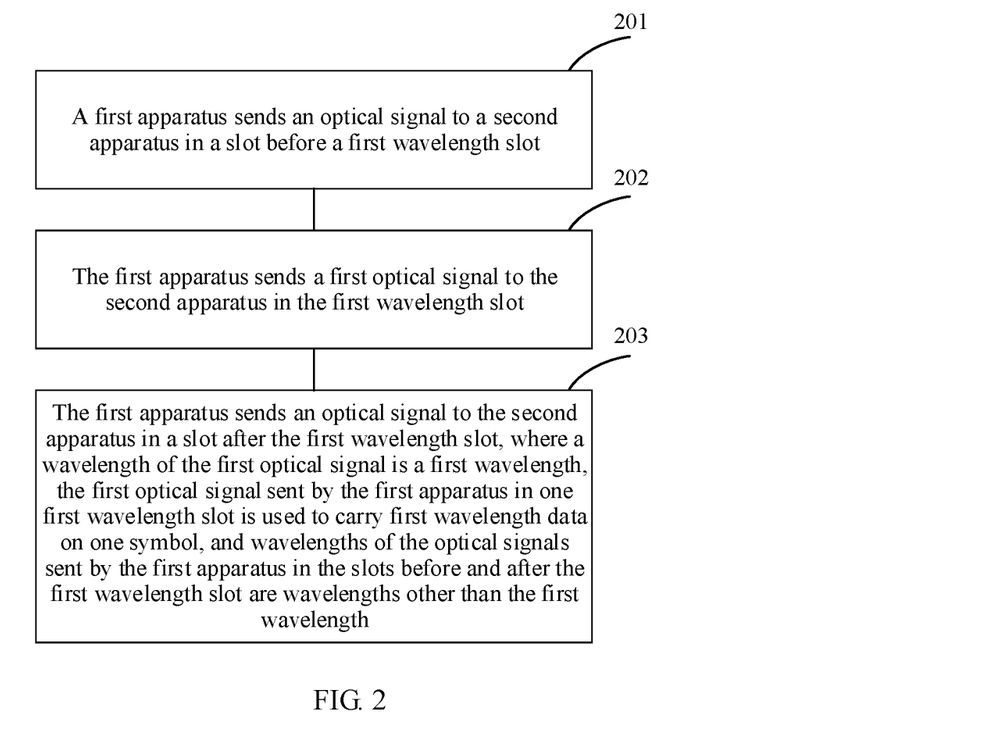
FIG. 2 is a flowchart of a signal sending method according to an embodiment of the present invention.

FIG. 2 is a flowchart of a signal sending method according to an embodiment of the present invention. The method includes the following steps:

S201. A first apparatus sends an optical signal to a second apparatus in a slot before a first wavelength slot.

S202. The first apparatus sends a first optical signal to the second apparatus in the first wavelength slot.

S203. The first apparatus sends an optical signal to the second apparatus in a slot after the first wavelength slot, where a wavelength of the first optical signal is a first wavelength, a first optical signal sent by the first apparatus in one first wavelength slot is used to carry first wavelength data on one symbol, and wavelengths of the optical signals sent by the first apparatus in the slots before and after the first wavelength slot are wavelengths other than the first wavelength.

If this embodiment of the present invention is applied to the system in FIG. 1a, the first apparatus may be the OLT 101, and the second apparatus may be the ODN 102. If this embodiment of the present invention is applied to the system in FIG. 1b, the first apparatus may be the sending apparatus 110, and the second apparatus may be the receiving apparatus 120.

In this embodiment of the present invention, the first apparatus sends the optical signals in both the adjacent slots of the first wavelength slot, but neither of the wavelengths of the sent optical signals includes the first wavelength. To be specific, a rate of sending the optical signal by the first apparatus is greater than a rate of sending the optical signal with the first wavelength by the first apparatus. In addition, the first optical signal sent in the first wavelength slot is used to carry the first wavelength data on the symbol. Therefore, a receiving and demodulation rate of the optical signal with the first wavelength is reduced. If the first optical signal sent in the first wavelength slot is used to carry first wavelength data on more than one symbol, a receiving and demodulation rate of the optical signal with the first wavelength cannot be reduced. In this embodiment of the present invention, the first apparatus does not continuously send the first wavelength data to the second apparatus, or does not continuously send first wavelength data on two symbols.

In this embodiment of the present invention, the slot before the first wavelength slot may be another wavelength slot, for example, may be a second wavelength slot. Alternatively, the slot before the first wavelength slot may not be a wavelength slot, and no optical signal is sent in the slot. The same is applied to the slot after the first wavelength slot.

The first apparatus may periodically send an optical signal. One sending period includes N slots, N is an integer greater than 1, and the N slots include at least one first wavelength slot. Certainly, in some embodiments, the first apparatus may alternatively aperiodically send an optical signal.

In a possible design, the slot after the first wavelength slot is a second wavelength slot. That the first apparatus sends an optical signal to the second apparatus in a slot after the first wavelength slot includes that the first apparatus sends a second optical signal to the second apparatus in the second wavelength slot. The method further includes: sending, by the first apparatus, an optical signal to the second apparatus in a slot after the second wavelength slot, where a wavelength of the second optical signal is a second wavelength, a second optical signal sent by the first apparatus in one second wavelength slot is used to carry second wavelength data on one symbol, and a wavelength of the optical signal sent by the first apparatus in the slot after the second wavelength slot is a wavelength other than the second wavelength. In this embodiment, the first apparatus may periodically send the optical signal, or may aperiodically send the optical signal.

The N slots in the sending period may further include another wavelength slot, for example, may include at least one $I^{th}$ wavelength slot, where I is an integer greater than 1 and less than or equal to N. A case in which optical signals are sent in the $I^{th}$ wavelength slot and adjacent slots is as follows: The first apparatus sends an optical signal to the second apparatus in a slot before the $I^{th}$ wavelength slot; the first apparatus sends an $I^{th}$ optical signal to the second apparatus in the $I^{th}$ wavelength slot; and the first apparatus sends an optical signal to the second apparatus in a slot after the $I^{th}$ wavelength slot, where a wavelength of the $I^{th}$ optical signal is an $I^{th}$ wavelength, an $I^{th}$ optical signal sent by the first apparatus in one $I^{th}$ wavelength slot is used to carry $I^{th}$ wavelength data on one symbol, and wavelengths of the optical signals sent by the first apparatus in the slots before and after the $I^{th}$ wavelength slot are wavelengths other than the $I^{th}$ wavelength. The adjacent wavelength slots of the $I^{th}$ wavelength slot may be other wavelength slots. For example, a slot before a third wavelength slot is a second wavelength slot, and a slot after the third wavelength slot is a fourth wavelength slot. The N slots in the sending period may be all wavelength slots. In an embodiment, there is one wavelength slot of each type. In an embodiment, there are two wavelength slots of each type. In an embodiment, there is one wavelength slot of each of some types, or there are two wavelength slots of each of some types. In conclusion, a quantity of wavelength slots may be flexibly configured.

The N slots in the sending period may further include at least one second wavelength slot. A case in which optical signals are sent in the second wavelength slot and adjacent slots is as follows: The first apparatus sends a first optical signal to the second apparatus in a slot before the second wavelength slot; the first apparatus sends a second optical signal to the second apparatus in the second wavelength slot; and the first apparatus sends an optical signal to the second apparatus in a slot after the second wavelength slot, where a wavelength of the second optical signal is a second wavelength, a second optical signal sent by the first apparatus in one second wavelength slot is used to carry second wavelength data on one symbol, wavelengths of the optical signals sent by the first apparatus in the slots before and after the second wavelength slot are wavelengths other than the second wavelength, and the slot after the first wavelength slot is the second wavelength slot.

The N slots in the sending period may include one first wavelength slot, or may include two first wavelength slots. There are (N/2−1) slots between the two first wavelength slots, where N may be exactly divided by 2. Alternatively, the N slots include J first wavelength slots, and there are (N/J−1) slots between two adjacent first wavelength slots, where N may be exactly divided by J. Certainly, the foregoing condition may not be met when a plurality of first wavelength slots are included, but a requirement for a receiver at a receive end is relatively high.

There are a total of N different wavelength slots in the N slots in the sending period. Different wavelength slots correspond to different wavelengths. There is one wavelength slot of each type, in other words, there is one first wavelength slot and one $I^{th}$ wavelength slot that are in the N slots, where I is an integer from 2 to N.

Optionally, a sending rate of the first apparatus is W, and duration of the first wavelength slot and duration of the slots before and after the first wavelength slot are all 1/W. The sending rate herein may be in a unit of a symbol per second, and the duration is in a unit of a second.

If this embodiment of the present invention is applied to an architecture of the system shown in FIG. 1a, the first device is an OLT, and the second apparatus is an ODN. The OLT periodically sends signals to a same ONU instead of continuously sending the signals to the same ONU, but does not continuously send corresponding data on two symbols. Different wavelengths are used for data on any two consecutive symbols that is sent by the OLT. To be specific, the OLT sends the data on the any two consecutive symbols to different ONUs. In some embodiments, if some ONUs have relatively high performance and high receiving rates, the OLT may also continuously send data on more than two symbols to the ONUs. This is not limited in this embodiment of the present invention.

The following uses a PON system in FIG. 1a as an example to describe application in this embodiment of the present invention. One OLT corresponds to N ONUs, and each ONU corresponds to one receiving wavelength. Different ONUs have different receiving wavelengths. A receiving wavelength of a $J^{th}$ ONU is a $J^{th}$ wavelength, where $1 \leq J \leq N$, and N is an integer greater than 1. A downlink sending rate of the OLT is 40 Gb/s. The OLT periodically sends an optical signal, and duration of each period is 1 ns. The OLT can send 40-bit data within one period (a sending rate corresponding to the 40-bit data sent in 1 ns is 40 Gb/s). The OLT uses an NRZ modulation scheme. One symbol corresponds to one bit, and one sending period may be divided into 40 slots.

Figure 3A:
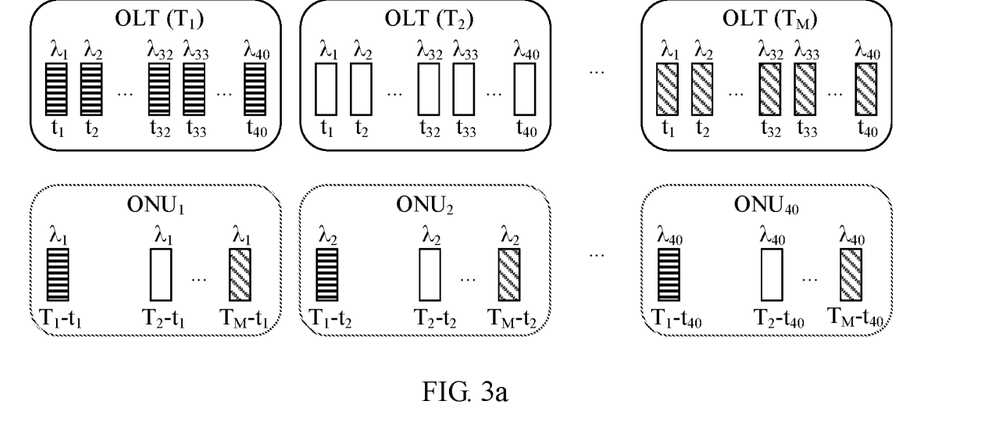
FIG. 3a is a schematic diagram of sending a signal according to an embodiment of the present invention.

FIG. 3a is a schematic diagram of sending a signal according to an embodiment of the present invention. In this embodiment, one OLT corresponds to 40 ONUs, and a receiving rate of each ONU is 1 Gb/s.

M large blocks shown in the upper half of FIG. 3a respectively indicate signals sent by the OLT in M sending periods. One sending period of the OLT includes 40 slots ($t_1$ to $t_{40}$). A wavelength of an optical signal sent in a first slot $t_1$ is a first wavelength $\lambda_1$, a wavelength of an optical signal sent in a second slot $t_2$ is a second wavelength $\lambda_2$, and so on. A wavelength of an optical signal sent in a $40^{th}$ slot $t_{40}$ is a $40^{th}$ wavelength $\lambda_{40}$. In other words, a wavelength of an optical signal sent in an $I^{th}$ slot $t_I$ is an $I^{th}$ wavelength $\lambda_I$, where I is an integer from 1 to 40. In one sending period of the OLT, the OLT sends data in only one slot for one ONU, and the data sent in the slot is data on one symbol.

40 large blocks shown in the lower half of FIG. 3a respectively indicate signals received by 40 ONUs. A receiving wavelength of a first ONU is a first wavelength $\lambda_1$, a receiving wavelength of a second ONU is a second wavelength $\lambda_2$, and so on. A receiving wavelength of a $40^{th}$ ONU is a $40^{th}$ wavelength $\lambda_{40}$. In other words, a receiving wavelength of a $J^{th}$ ONU is a first wavelength $\lambda_J$, where J is an integer from 1 to 40. Corresponding to one sending period of the OLT, one ONU needs to receive data on only one symbol, to be specific, needs to receive 1-bit data within 1 ns. Therefore, a requirement can be met when a receiving rate reaches 1 Gb/s.

Figure 3B:
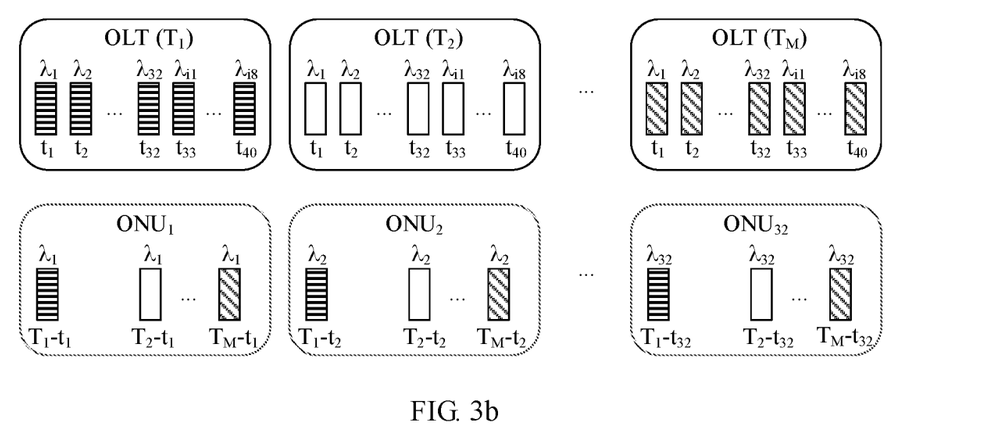
FIG. 3b is another schematic diagram of sending a signal according to an embodiment of the present invention.

In this embodiment of the present invention, each slot in one sending period corresponds to one ONU. In some embodiments, some slots may not correspond to an ONU. FIG. 3b is another schematic diagram of sending a signal according to an embodiment of the present invention. In this embodiment, one OLT corresponds to 32 ONUs, and a receiving rate of each ONU is 1 Gb/s.

M large blocks shown in the upper half of FIG. 3b respectively indicate signals sent by the OLT in M sending periods. One sending period of the OLT includes 40 slots ($t_1$ to $t_{40}$). A wavelength of an optical signal sent in a first slot $t_1$ is a first wavelength $\lambda_1$, a wavelength of an optical signal sent in a second slot $t_2$ is a second wavelength $\lambda_2$, and so on. A wavelength of an optical signal sent in a $32^{nd}$ slot $t_{32}$ is a $32^{nd}$ wavelength $\lambda_{32}$. In other words, a wavelength of an optical signal sent in an $I^{th}$ slot $t_I$ is an $I^{th}$ wavelength $\lambda_I$, where I is an integer from 1 to 32. In a $33^{rd}$ slot to a $40^{th}$ slot, an optical signal may not be sent, or an optical signal with a wavelength other than the first wavelength to a $32^{nd}$ wavelength may be sent.

32 large blocks shown in the lower half of FIG. 3b respectively indicate signals received by 32 ONUs. A receiving wavelength of a first ONU is a first wavelength $\lambda_1$, a receiving wavelength of a second ONU is a second wavelength $\lambda_2$, and so on. A receiving wavelength of a $32^{nd}$ ONU is a $32^{nd}$ wavelength $\lambda_{32}$. In other words, a receiving wavelength of a $J^{th}$ ONU is a first wavelength $\lambda_J$, where J is an integer from 1 to 32.

Figure 3C:
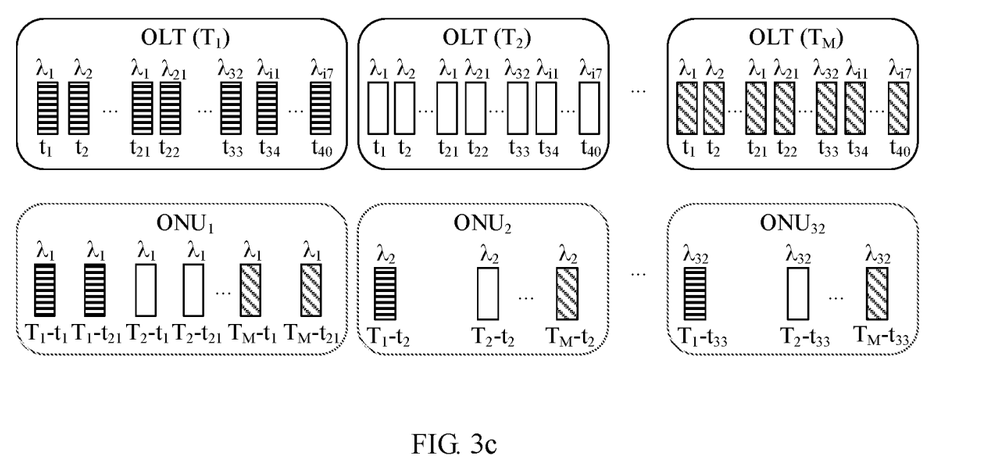
FIG. 3c is still another schematic diagram of sending a signal according to an embodiment of the present invention.

In this embodiment of the present invention, a $33^{rd}$ slot to a $40^{th}$ slot are idle, and these slots may be reserved for expansion. For example, service requirements of some ONUs increase and require expansion to 2 Gb/s. FIG. 3c is still another schematic diagram of sending a signal according to an embodiment of the present invention. In this embodiment, one OLT corresponds to 32 ONUs, a receiving rate of the first ONU is 2 Gb/s, and receiving rates of all remaining ONUs are 1 Gb/s. In comparison with the solution in FIG. 3b, expansion processing is performed on the first ONU in this embodiment of the present invention.

M large blocks shown in the upper half of FIG. 3c respectively indicate signals sent by the OLT in M sending periods. One sending period of the OLT includes 40 slots ($t_1$ to $t_{40}$). A wavelength of an optical signal sent in a first slot $t_1$ is a first wavelength $\lambda_1$, and a wavelength of an optical signal sent in a $21^{st}$ slot $t_{21}$ is also a first wavelength $\lambda_1$. Corresponding to one sending period of the OLT, a first ONU needs to receive data on two symbols. The data on two symbols is evenly distributed. To be specific, 1-bit data needs to be received in 0.5 ns. Therefore, a requirement can be met when a receiving rate reaches 2 Gb/s. In a $34^{th}$ slot to a $40^{th}$ slot, an optical signal may not be sent, or an optical signal with a wavelength other than the first wavelength to a $32^{nd}$ wavelength may be sent.

32 large blocks shown in the lower half of FIG. 3c respectively indicate signals received by 32 ONUs. A receiving wavelength of the first ONU is a first wavelength $\lambda_1$, a receiving wavelength of a second ONU is a second wavelength $\lambda_2$, and so on. A receiving wavelength of a $32^{nd}$ ONU is a $32^{nd}$ wavelength $\lambda_{32}$. In other words, a receiving wavelength of a $J^{th}$ ONU is a first wavelength $\lambda_J$, where J is an integer from 1 to 32.

In the foregoing embodiments, the OLT uses the NRZ modulation scheme, and one symbol corresponds to one bit. If the PAM 4 modulation scheme is used, one symbol corresponds to two bits. If a downlink sending rate of the OLT is 40 Gb/s, and duration of one sending period is also set to 1 ns, one sending period may be divided into 20 slots, and each slot corresponds to data on one symbol.

In the foregoing embodiments, an optical signal with only one wavelength is sent in one slot. In other words, an optical signal sent to the second apparatus in a first wavelength slot does not include an optical signal with a wavelength other than the first wavelength. In another embodiment, an optical signal with a plurality of wavelengths may be sent in one slot. For example, an optical signal with two wavelengths is sent. For example, referring to FIG. 3a, wavelengths of optical signals sent in the first slot $t_1$ are the first wavelength $\lambda_1$ and a $41^{st}$ wavelength $\lambda_{41}$, wavelengths of optical signals sent in the second slot $t_2$ are the second wavelength $\lambda_2$ and a $42^{nd}$ wavelength $\lambda_{42}$, and so on. Wavelengths of optical signals sent in the $40^{th}$ slot $t_{40}$ are the $40^{th}$ wavelength $\lambda_{40}$ and an $80^{th}$ wavelength $\lambda_{80}$. In other words, that is, wavelengths of optical signals sent in the $I^{th}$ slot $t_I$ are the $I^{th}$ wavelength $\lambda_I$ and a $(40+I)^{th}$ wavelength $\lambda_{I+40}$, where I is an integer from 1 to 40. Alternatively, an optical signal with a wavelength may be continuously sent in the 40 slots of the period, and the wavelength does not conflict with another wavelength sent in the 40 slots. Alternatively, laser light of a wavelength may be continuously sent in the 40 slots of the period, the laser light does not carry data, and the wavelength does not conflict with another wavelength sent in the 40 slots. If an optical signal with only one wavelength is sent in a slot, signal crosstalk is smaller and signal receiving quality is good. If optical signals of a plurality of wavelengths are sent simultaneously, and signal crosstalk is large, a non-linear effect is large, and a requirement for a receive end is high.

The first apparatus may send an optical signal by using a laser and a modulator. The laser generates laser light of a corresponding wavelength in the corresponding slot. The modulator loads data on one symbol onto the laser light in the corresponding slot to obtain a modulated optical signal.

Figure 4:
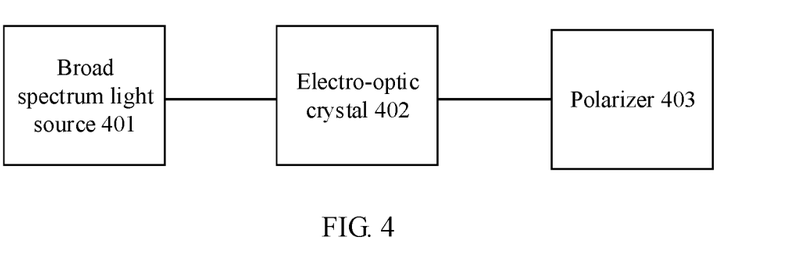
FIG. 4 is a schematic structural diagram of a laser with an adjustable wavelength according to an embodiment of the present invention.

The laser may be a laser with an adjustable wavelength. FIG. 4 is a schematic structural diagram of a laser with an adjustable wavelength according to an embodiment of the present invention. The laser includes a broad spectrum light source 401, an electro-optic crystal 402, and a polarizer 403. The broad spectrum light source 401 is used to send broad spectrum laser light with linear polarization to the electro-optic crystal 402. In a slot, a polarization rotation angle of laser light of only a specific wavelength in the broad spectrum laser light exceeds a specified threshold after the laser light passes through the electro-optic crystal 402, and the polarizer 403 is configured to receive broad spectrum light processed by the electro-optic crystal 402. The laser light whose polarization rotation angle exceeds the specified threshold can pass through the polarizer 403. Laser light whose polarization rotation angle is less than the specified threshold cannot pass through the polarizer 403. Luminous fluxes of laser light whose polarization rotation angle is less than the specified threshold and that passes through the polarizer 403 are relatively small, and may be ignored compared with luminous fluxes of laser light whose polarization rotation angle is greater than the specified threshold and that passes through the polarizer 403. In an embodiment, it is assumed that a transmission direction of the broad spectrum light is X, before laser light in the broad spectrum light is incident onto the electro-optic crystal 402, all polarization directions of the laser light in the broad spectrum light are Y, the electro-optic crystal is periodically polarized, and a polarization direction is parallel to a Z direction. A modulating voltage is set on a Z plane of the electro-optic crystal, and a voltage value of the modulating voltage is adjusted, so that a polarization rotation angle of laser light of a specific wavelength in a specific slot exceeds the specified threshold after the laser light passes through the electro-optic crystal, and reaches 90 degrees to be in the Z direction. Laser light of remaining wavelengths basically has no polarization rotation, and remains in a Y direction. In addition, only laser light in a Z polarization direction can pass through the polarizer, so that laser light of only a specific wavelength is output in one slot. Currently, a modulation rate of the electro-optic crystal can reach 40 Gb/s. The laser may alternatively be implemented by using a plurality of pulse lasers. For example, duration of each pulse is 1/W, and a pulse transmission time of a following pulse laser light is 1/W later than a transmission time of a current pulse laser light. The modulator may be modulated by using an existing modulator, provided that data on one symbol can be loaded onto laser light in a corresponding slot.

Embodiments of the present invention provide a signal sending apparatus, where the apparatus includes a transmitter, configured to send an optical signal to a second apparatus in a slot before a first wavelength slot. The transmitter is further configured to send a first optical signal to the second apparatus in the first wavelength slot. The transmitter is further configured to send an optical signal to the second apparatus in a slot after the first wavelength slot. A wavelength of the first optical signal is a first wavelength. The first optical signal sent by the first apparatus in one first wavelength slot is used to carry first wavelength data on one symbol. Wavelengths of the optical signals sent by the first apparatus in the slots before and after the first wavelength slot are wavelengths other than the first wavelength.

In a possible design, the transmitter periodically sends an optical signal. One sending period includes N slots, N is an integer greater than 1, and the N slots include at least one first wavelength slot.

In a possible design, the slot after the first wavelength slot is a second wavelength slot. That the transmitter is further configured to send the optical signal to the second apparatus in the slot after the first wavelength slot includes that the transmitter is further configured to send a second optical signal to the second apparatus in the second wavelength slot; and the transmitter is further configured to send an optical signal to the second apparatus in a slot after the second wavelength slot. A wavelength of the second optical signal is a second wavelength. The second optical signal sent by the first apparatus in one second wavelength slot is used to carry second wavelength data on one symbol. A wavelength of the optical signal sent by the first apparatus in the slot after the second wavelength slot is a wavelength other than the second wavelength.

In a possible design, the N slots further include at least one $I^{th}$ wavelength slot, where I is an integer greater than 1 and less than or equal to N. The transmitter is further configured to send an optical signal to the second apparatus in a slot before the $I^{th}$ wavelength slot. The transmitter is further configured to send an $I^{th}$ optical signal to the second apparatus in the $I^{th}$ wavelength slot. The transmitter is further configured to send an optical signal to the second apparatus in a slot after the $I^{th}$ wavelength slot. A wavelength of the $I^{th}$ optical signal is an $I^{th}$ wavelength. The $I^{th}$ optical signal sent by the first apparatus in one $I^{th}$ wavelength slot is used to carry $I^{th}$ wavelength data on one symbol. Wavelengths of the optical signals sent by the first apparatus in the slots before and after the $I^{th}$ wavelength slot are wavelengths other than the $I^{th}$ wavelength.

In a possible design, the N slots further include at least one second wavelength slot. The transmitter is further configured to send the first optical signal to the second apparatus in the slot before the second wavelength slot. The transmitter is further configured to send a second optical signal to the second apparatus in the second wavelength slot. The transmitter is further configured to send an optical signal to the second apparatus in a slot after the second wavelength slot. A wavelength of the second optical signal is a second wavelength. The second optical signal sent by the first apparatus in one second wavelength slot is used to carry second wavelength data on one symbol. Wavelengths of the optical signals sent by the first apparatus in the slots before and after the second wavelength slot are wavelengths other than the second wavelength. The slot after the first wavelength slot is the second wavelength slot.

In a possible design, the N slots include one first wavelength slot. Alternatively, the N slots include two first wavelength slots. There are (N/2−1) slots between the two first wavelength slots, where N may be exactly divided by 2. Alternatively, the N slots include J first wavelength slots, and there are (N/J−1) slots between two adjacent first wavelength slots, where N may be exactly divided by J.

In a possible design, there is one first wavelength slot and one $I^{th}$ wavelength slot that are in the N slots, where I is an integer from 2 to N.

In a possible design, a sending rate of the transmitter is W, and duration of the first wavelength slot, duration of the slot before the first wavelength slot, and duration of the slot after the first wavelength slot are all 1/W.

In a possible design, the transmitter includes a laser and a modulator. The laser is configured to generate laser light of the first wavelength in the first wavelength slot. The modulator is configured to modulate the laser light of the first wavelength in the first wavelength slot by using the first wavelength data on one symbol, to obtain the first optical signal.

In a possible design, the transmitter includes a laser and a modulator. The laser is configured to generate laser light of the first wavelength in the first wavelength slot. The laser is further configured to generate laser light of the second wavelength in the slot after the first wavelength slot. The modulator is configured to modulate the laser light of the first wavelength in the first wavelength slot by using the first wavelength data on one symbol, to obtain the first optical signal. The modulator is further configured to modulate the laser light of the second wavelength in the slot after the first wavelength slot by using the second wavelength data on one symbol, to obtain the second optical signal.

It should be noted that division of the modules in the foregoing device is merely logical function division. During actual implementation, all or some of the modules may be integrated into one physical entity, or may be physically separated. In addition, these modules may be all implemented in a form of software invoked by a processing element, or may be all implemented in a form of hardware; or some modules may be implemented in a form of software invoked by a processing element, and some modules are implemented in a form of hardware. For example, the sending module may be a separately disposed element, or may be integrated into a chip of the foregoing device for implementation. In addition, the sending module may be stored in a memory of the device in a form of program code and invoked by a processing element of the device to perform a function of the determining module. Implementation of another module is similar to this. In addition, the modules may be all or partially integrated, or may be implemented separately. The processing element may be an integrated circuit and has a signal processing capability. In an implementation process, steps in the foregoing methods or the foregoing modules can be implemented by using a hardware integrated logical circuit in the processor element, or by using instructions in a form of software.

For example, the foregoing modules may be configured as one or more integrated circuits for performing the foregoing methods, for example, one or more application-specific integrated circuits (ASIC), one or more microprocessors (DSP), or one or more field programmable gate arrays (FPGA). For another example, when a module is implemented in a form of program code invoked by a processing element, the processing element may be a general-purpose processor, for example, a central processing unit (CPU) or another processor that can invoke the program code. For another example, the modules may be integrated together, and implemented in a form of a system-on-a-chip (SOC).

It should be understood that first, second, third, fourth, and various numbers in this specification are merely used for differentiation for ease of description, and are not construed as a limitation on the scope of the embodiments of the present invention.

Figure 5:
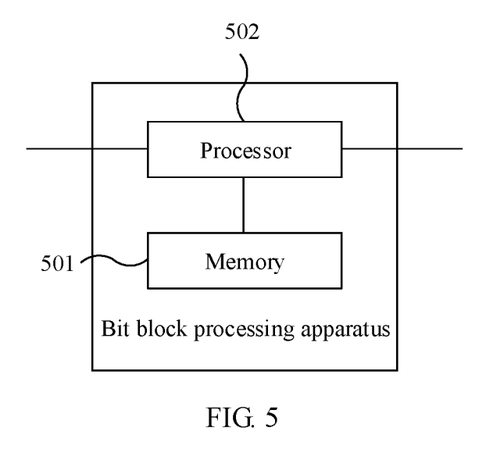
FIG. 5 is a schematic structural diagram of a signal sending apparatus according to an embodiment of the present invention.

FIG. 5 is a schematic structural diagram of a signal sending apparatus according to an embodiment of the present invention. As shown in FIG. 5, the apparatus includes a memory 501 and a processor 502.

The memory 501 may be an independent physical unit, and may be connected to the processor 502 by using a bus. The memory 501 and the processor 502 may alternatively be integrated together by using hardware and the like.

The memory 501 is configured to store a program for implementing the foregoing method embodiments. The processor 502 invokes the program to perform the operations in the foregoing method embodiments.

Optionally, when the service data transmission method in the foregoing embodiments is partially or completely implemented by using software, the apparatus may alternatively include only the processor. The memory configured to store the program is located outside an access device, and the processor is connected to the memory by using a circuit/cable, to read and execute the program stored in the memory.

The processor may be a central processing unit (CPU), a network processor (NP), or a combination of a CPU and an NP.

The processor may further include a hardware chip. The hardware chip may be an application-specific integrated circuit (ASIC), a programmable logic device (PLD), or a combination thereof. The PLD may be a complex programmable logical device (CPLD), a field programmable gate array (FPGA), generic array logic (GAL), or any combination thereof.

The memory may include a volatile memory, for example, a random-access memory (RAM), or may include a non-volatile memory, for example, a flash memory, a hard disk drive (HDD), or a solid state drive (SSD), or may include a combination of the foregoing types of memories.

Embodiments of the present invention further provide a computer storage medium that stores a computer program. The computer program is used to perform the service data transmission method provided in the foregoing embodiments.

Embodiments of the present invention further provide a computer program product including an instruction. When the computer program product is run on a computer, the computer is enabled to perform the service data transmission method provided in the foregoing embodiments.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more procedures in the flowcharts and/or in one or more blocks in the block diagrams.

These computer program instructions may alternatively be stored in a computer readable memory that can instruct the computer or another programmable data processing device to work in a specific manner, so that the instructions stored in the computer readable memory generate an artifact that includes an instruction apparatus. The instruction apparatus implements a specific function in one or more procedures in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

What is claimed is:

1. A signal sending method, comprising:

sending, by a first apparatus, a second optical signal to a second apparatus in a slot before a first wavelength slot;

sending, by the first apparatus, a first optical signal to the second apparatus in the first wavelength slot; and sending, by the first apparatus, a third optical signal to the second apparatus in a slot after the first wavelength slot, wherein a wavelength of the first optical signal is a first wavelength, the first optical signal sent by the first apparatus in the first wavelength slot is used to carry first wavelength data for only one optical network unit on only one symbol during one sending period of the first apparatus and wavelengths of the second and third optical signals sent by the first apparatus in the slots before and after the first wavelength slot are wavelengths other than the first wavelength.

2. The method according to claim 1, wherein the first apparatus periodically sends an optical signal, one sending period comprises N slots, N is an integer greater than 1, and the N slots comprise at least one first wavelength slot.

3. The method according to claim 2, wherein the N slots further comprise an $I^{th}$ wavelength slot; I is an integer greater than 1 and less than or equal to N; and the method further comprises:

sending, by the first apparatus, an $(I-1)^{th}$ optical signal to the second apparatus in a slot before the $I^{th}$ wavelength slot;

sending, by the first apparatus, an $I^{th}$ optical signal to the second apparatus in the $I^{th}$ wavelength slot; and sending, by the first apparatus, an $(I+1)^{th}$ optical signal to the second apparatus in a slot after the $I^{th}$ wavelength slot, wherein a wavelength of the $I^{th}$ optical signal is an $I^{th}$ wavelength, the $I^{th}$ optical signal sent by the first apparatus in the $I^{th}$ wavelength slot is used to carry $I^{th}$ wavelength data on only one symbol during the one sending period of the first apparatus and the $(I-1)^{th}$ and $(I+1)^{th}$ wavelengths of the optical signals sent by the first apparatus in the slots before and after the $I^{th}$ wavelength slot are wavelengths other than the $I^{th}$ wavelength.

4. The method according to claim 3, wherein there is one first wavelength slot and one $I^{th}$ wavelength slot that are in the N slots, and I is an integer from 2 to N.

5. The method according to claim 2, wherein the N slots further comprise a second wavelength slot, and the method further comprises:
    sending, by the first apparatus, a fourth optical signal to the second apparatus in a slot before the second wavelength slot;
    sending, by the first apparatus, a fifth optical signal to the second apparatus in the second wavelength slot; and
    sending, by the first apparatus, a sixth optical signal to the second apparatus in a slot after the second wavelength slot, wherein a wavelength of the fifth optical signal is a fifth wavelength, the fifth optical signal sent by the first apparatus in the second wavelength slot is used to carry second wavelength data on only one symbol during the one sending period of the first apparatus wavelengths of the fourth and sixth optical signals sent by the first apparatus in the slots before and after the second wavelength slot are wavelengths other than the second wavelength, and the slot after the first wavelength slot is the second wavelength slot.

6. The method according to claim 2, wherein
    the N slots comprise one first wavelength slot; or
    the N slots comprise two first wavelength slots, and there are (N/2−1) slots between the two first wavelength slots, wherein N may be exactly divided by 2; or
    the N slots comprise J first wavelength slots, and there are (N/J−1) slots between two adjacent first wavelength slots, wherein N may be exactly divided by J.

7. The method according to claim 1, wherein the slot after the first wavelength slot is a third wavelength slot; and the method further comprises:
    sending, by the first apparatus, a fourth optical signal to the second apparatus in a slot after the third wavelength slot, wherein a wavelength of the third optical signal is a third wavelength, the third optical signal sent by the first apparatus in the third wavelength slot is used to carry third wavelength data on only one symbol during the one sending period of the first apparatus and a wavelength of the fourth optical signal sent by the first apparatus in the slot after the third wavelength slot is a wavelength other than the third wavelength.

8. The method according to claim 1, wherein a sending rate of the first apparatus is W, and a duration of the first wavelength slot and durations of the slots before and after the first wavelength slot are all 1/W.

9. The method according to claim 1, wherein the first apparatus is an optical line terminal, and the second apparatus is an optical distribution network.

10. A signal sending apparatus, comprising:
    a transmitter, configured to send a second optical signal to a second apparatus in a slot before a first wavelength slot, wherein
    the transmitter is further configured to send a first optical signal to the second apparatus in the first wavelength slot; and
    the transmitter is further configured to send a third optical signal to the second apparatus in a slot after the first wavelength slot, wherein a wavelength of the first optical signal is a first wavelength, the first optical signal sent by the first apparatus in the first wavelength slot is used to carry first wavelength data for only one optical network unit on only one symbol during one sending period of the apparatus and wavelengths of the second and third optical signals sent by the first apparatus in the slots before and after the first wavelength slot are wavelengths other than the first wavelength.

11. The apparatus according to claim 10, wherein the transmitter periodically sends an optical signal, one sending period comprises N slots, N is an integer greater than 1, and the N slots comprise at least one first wavelength slot.

12. The apparatus according to claim 11, wherein the N slots further comprise an $I^{th}$ wavelength slot, and I is an integer greater than 1 and less than or equal to N;
    the transmitter is further configured to send an $(I-1)^{th}$ optical signal to the second apparatus in a slot before the $I^{th}$ wavelength slot;
    the transmitter is further configured to send an $I^{th}$ optical signal to the second apparatus in the $I^{th}$ wavelength slot; and
    the transmitter is further configured to send an $(I+1)^{th}$ optical signal to the second apparatus in a slot after the $I^{th}$ wavelength slot, wherein a wavelength of the $I^{th}$ optical signal is an $I^{th}$ wavelength, the $I^{th}$ optical signal sent by the first apparatus in the $I^{th}$ wavelength slot is used to carry $I^{th}$ wavelength data on only one symbol during the one sending period of the apparatus and wavelengths of the $(I-1)^{th}$ and $(I+1)^{th}$ optical signals sent by the first apparatus in the slots before and after the $I^{th}$ wavelength slot are wavelengths other than the $I^{th}$ wavelength.

13. The apparatus according to claim 12, wherein there is one first wavelength slot and one $I^{th}$ wavelength slot that are in the N slots, and I is an integer from 2 to N.

14. The apparatus according to claim 11, wherein the N slots further comprise a second wavelength slot;
    the transmitter is further configured to send a fourth optical signal to the second apparatus in a slot before the second wavelength slot;
    the transmitter is further configured to send a fifth optical signal to the second apparatus in the second wavelength slot; and
    the transmitter is further configured to send a sixth optical signal to the second apparatus in a slot after the second wavelength slot, wherein a wavelength of the fifth optical signal is a fifth wavelength, the fifth optical signal sent by the first apparatus in the second wavelength slot is used to carry second wavelength data on only one symbol during the one sending period of the apparatus wavelengths of the fourth and sixth optical signals sent by the first apparatus in the slots before and after the second wavelength slot are wavelengths other than the second wavelength, and the slot after the first wavelength slot is the second wavelength slot.

15. The apparatus according to claim 11, wherein
    the N slots comprise one first wavelength slot; or
    the N slots comprise two first wavelength slots, and there are (N/2−1) slots between the two first wavelength slots, wherein N may be exactly divided by 2; or
    the N slots comprise J first wavelength slots, and there are (N/J−1) slots between two adjacent first wavelength slots, wherein N may be exactly divided by J.

16. The apparatus according to claim 10, wherein the slot after the first wavelength slot is a third wavelength slot; and
    the transmitter is further configured to send a fourth optical signal to the second apparatus in a slot after the second wavelength slot, wherein a wavelength of the third optical signal is a third wavelength, the third optical signal sent by the first apparatus in the third wavelength slot is used to carry third wavelength data on only one symbol during the one sending period of the apparatus and a wavelength of the fourth optical signal sent by the first apparatus in the slot after the third wavelength slot is a wavelength other than the third wavelength.

17. The apparatus according to claim 16, wherein the transmitter comprises a laser and a modulator; the laser is configured to generate a laser light of the first wavelength in the first wavelength slot, and is further configured to generate a laser light of the second wavelength in the slot after the first wavelength slot; and the modulator is configured to modulate the laser light of the first wavelength in the first wavelength slot by using the first wavelength data on the only one symbol, to obtain the first optical signal, and is further configured to modulate the laser light of the second wavelength in the slot after the first wavelength slot by using the second wavelength data on the symbol, to obtain the second optical signal.

18. The apparatus according to claim 10, wherein a sending rate of the transmitter is W, and a duration of the first wavelength slot and durations of the slots before and after the first wavelength slot are all 1/W.

19. The apparatus according to claim 10, wherein the transmitter comprises a laser and a modulator; the laser is configured to generate a laser light of the first wavelength in the first wavelength slot; and the modulator is configured to modulate the laser light of the first wavelength in the first wavelength slot using first wavelength data on the only one symbol, to obtain the first optical signal.

* * * * *